United States Patent
Wilson

(10) Patent No.: US 10,152,263 B2
(45) Date of Patent: Dec. 11, 2018

(54) DATA STORAGE SYSTEMS, COMPUTING SYSTEMS, METHODS FOR CONTROLLING A DATA STORAGE SYSTEM, AND METHODS FOR CONTROLLING A COMPUTING SYSTEM

(71) Applicant: RAZER (ASIA-PACIFIC) PTE. LTD., Singapore (SG)

(72) Inventor: John Alexander Wilson, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 25 days.

(21) Appl. No.: 15/321,268

(22) PCT Filed: Jul. 1, 2014

(86) PCT No.: PCT/US2014/044981
§ 371 (c)(1),
(2) Date: Dec. 22, 2016

(87) PCT Pub. No.: WO2016/003438
PCT Pub. Date: Jan. 7, 2016

(65) Prior Publication Data
US 2017/0177268 A1    Jun. 22, 2017

(51) Int. Cl.
*G06F 3/06* (2006.01)
*G06F 13/38* (2006.01)

(52) U.S. Cl.
CPC ............ *G06F 3/0644* (2013.01); *G06F 3/061* (2013.01); *G06F 3/0604* (2013.01); *G06F 3/0649* (2013.01); *G06F 3/0683* (2013.01); *G06F 3/0685* (2013.01); *G06F 13/385* (2013.01); *G06F 3/067* (2013.01); *G06F 2213/3802* (2013.01)

(58) Field of Classification Search
None
See application file for complete search history.

(56) References Cited

U.S. PATENT DOCUMENTS

| | | |
|---|---|---|
| 2008/0263259 A1 | 10/2008 | Sadovsky et al. |
| 2009/0043831 A1 | 2/2009 | Antonopoulos et al. |
| 2010/0251077 A1 | 9/2010 | Kim et al. |
| 2011/0179219 A1 | 7/2011 | Ma et al. |
| 2011/0320690 A1 | 12/2011 | Petersen et al. |

(Continued)

FOREIGN PATENT DOCUMENTS

| | | |
|---|---|---|
| CN | 101604548 A | 12/2009 |
| CN | 101840378 B | 9/2010 |

(Continued)

OTHER PUBLICATIONS

Extended European Search Report dated Feb. 5, 2018 in corresponding EP Patent Application No. 14896552.8, 8 pages.

*Primary Examiner* — Brian R Peugh
(74) *Attorney, Agent, or Firm* — Polsinelli PC

(57) ABSTRACT

According to various embodiments, a data storage system may be provided. The data storage system may include: a first storage device; a second storage device; a data receiver configured to receive data to be stored in the data storage system and an indicator indicating a storage profile for the data; and a storage controller configured to determine based on the indicator whether to store the data on the first storage device or to store the data on the second storage device.

15 Claims, 2 Drawing Sheets

(56) References Cited

U.S. PATENT DOCUMENTS

2012/0166712 A1  6/2012  Lary
2013/0060999 A1  3/2013  Chiu et al.
2013/0198449 A1  8/2013  Belluomini et al.

FOREIGN PATENT DOCUMENTS

CN  102043727 A  5/2011
CN  102156753 A  8/2011
KR  10-2013-0037181 A  4/2013

DATA STORAGE SYSTEMS, COMPUTING SYSTEMS, METHODS FOR CONTROLLING A DATA STORAGE SYSTEM, AND METHODS FOR CONTROLLING A COMPUTING SYSTEM

TECHNICAL FIELD

Various embodiments generally relate to data storage systems, computing systems, methods for controlling a data storage system, and methods for controlling a computing system.

BACKGROUND

Data may be stored on a variety of devices, for example hard disk drives (HDDs) or solid state disk drives (SSDs). While HDDs are cheaper than SSDs in terms of cost per data storage capacity, SSDs may be faster than HDDs. Thus, when both types of storage devices are present, the need for an efficient way of determining where to store which data may arise.

SUMMARY OF THE INVENTION

According to various embodiments, a data storage system may be provided. The data storage system may include: a first storage device; a second storage device; a data receiver configured to receive data to be stored in the data storage system and an indicator indicating a storage profile for the data; and a storage controller configured to determine drive based on the indicator whether to store the data on the first storage device or to store the data on the second storage device.

According to various embodiments, a method for controlling a data storage system may be provided. The method may include: controlling a first storage device of the data storage system; controlling a second storage device of the data storage system; receiving data to be stored in the data storage system and an indicator indicating a storage profile for the data; and determining based on the indicator whether to store the data on the first storage device or to store the data on the second storage device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1:
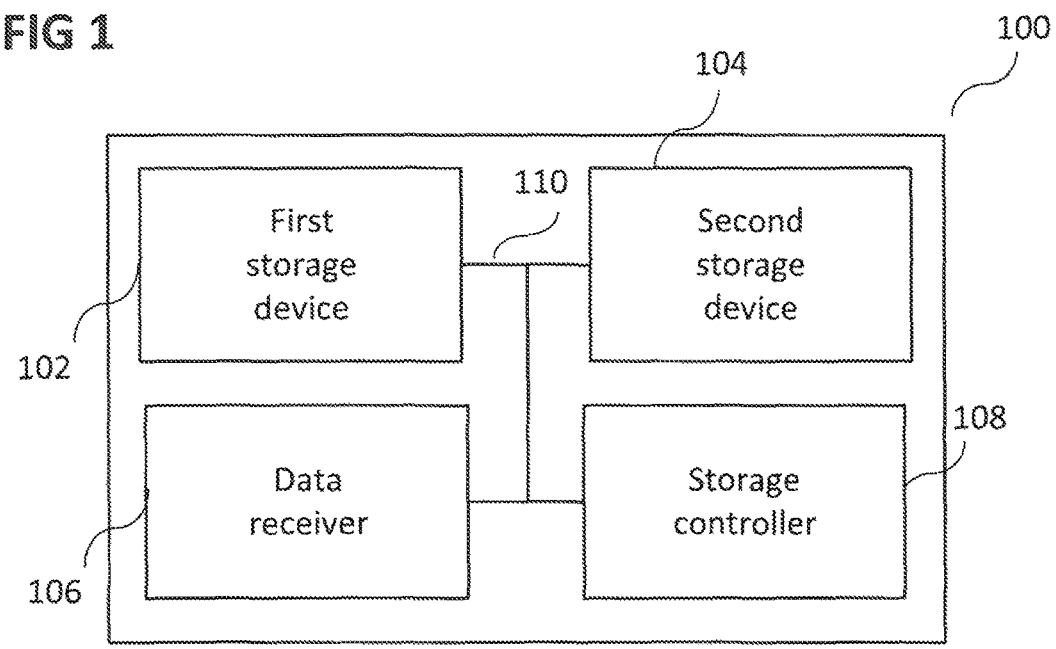
FIG. 1 shows a data storage system in accordance with an embodiment.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understand that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

The data storage system may include a memory which is for example used in the processing earned out by the data storage system. The computing system may include a memory which is for example used in the processing carried out by the computing system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Data may be stored on a variety of devices, for example on a hard disk drive (HDD) and/or on a solid state disk drive (SSD). While HDDs may be cheaper than SSDs in terms of cost per data storage capacity, SSDs may be faster than HDDs. Thus, when both types of storage devices are present, the need for an efficient way of determining where to store the data may arise.

A hard disk drive (M) will be understood as a data storage, wherein data is stored on movable (for example turning) disks using a magnetic storing mechanism.

A solid state drive (SSD) may be understood as a non-volatile data storage, wherein data is stored without any mechanical movement. For example, a SSD may include flash memory, e.g., a floating gate memory, a charge trapping memory, an MRAM (Magnetoresistive Random Access Memory) or a PCRAM (Phase Change Random Access Memory).

FIG. 1 shows a data storage system 100 in accordance with an embodiment. The data storage system 100 may include a first storage device 102. The first storage device may be or may include a hard disk drive and/or a solid state drive. The data storage system 100 may further include a second storage device 104. The second storage device may be or may include or hard disk drive and/or a solid state drive. The data storage system 100 may further include a data receiver 106 (in other words: a data reception circuit) configured to receive data to be stored in the data storage system 100 and an indicator indicating a storage profile for the data. The data storage system 100 may further include a storage controller 108 (in other words: a storage controlling circuit) configured to determine based on the indicator whether to store the data on the first storage device 102 or to store the data on the second storage device 104. The first storage device 102, the second, storage device 104, the data receiver 106, and the storage controller 108 may be connected via a connection 110 for a plurality of separate connections), for example an electrical or optical connection, for example any kind of cable or bus.

In other words, a data storage system 100 may be provided. The data storage system 100 may receive data and an indicator using a data receiver 106. The data may be data to be stored in the data storage system. The indicator may indicate a storage profile for the data. The storage profile may indicate where (on the first storage device 102 or on the second storage device 104) to store the data. A storage controller may determine whether to store the data on the first storage device 102 or on the second storage device 104 based on the indicator.

The storage profile may include or may be information indicating which portions of the data are to be stored on the first storage device 102 and which portions of the data are to be stored on the second storage device 104.

The storage controller 108 may further be configured to store the data on the first storage device 102 or on the second storage device 104 based on the determination upon reception of the data and the indicator by the data receiver 106.

Figure 2:
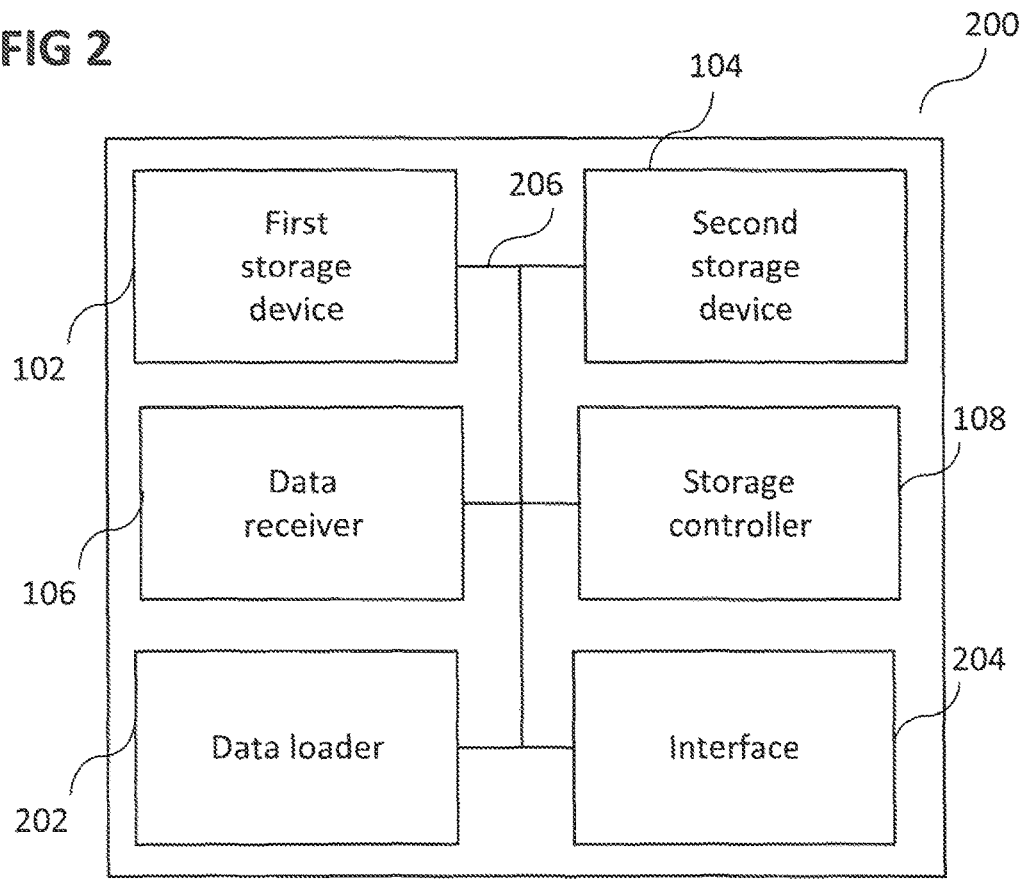
FIG. 2 shows a data storage system in accordance with an embodiment.

FIG. 2 shows a data storage system 200 in accordance with an embodiment. The data storage system 200 may, similar to the data storage system 100 of FIG. 1, include a first storage device 102. The data storage system 200 may, similar to the data storage system 100 of FIG. 1, further include a second storage device 104. The data storage system 200 may, similar to the data storage system 100 of FIG. 1, further include a data receiver 106. The data storage system 200 may, similar to the data storage system 100 of FIG. 1, further include a storage controller 108. The data storage system 200 may further include a data loader 202 (in other words: a data loading circuit), like will be described below. The data storage system 200 may further include an interface 204, like will be described below. The first storage device 102, the second storage device 104, the data receiver 106, the storage controller 108, the data loader 202, and the interface 204 may be connected via a connection 206 (or a plurality of separate connections), for example an electrical or optical connection, for example any kind of cable or bus.

The data loader 202 may be configured to load at least a part of the data to an application processor (which is not shown in FIG. 2, and which may be not a part of the data storage system). The storage controller 108 may further be configured to store the data on the first storage device 102 or on the second storage device 104 based on the determination upon the loading of the at least part of the data. In other words: based on the determination, the storage controller 108 may store the data either on the first storage device 102 or on the second storage device 104.

The storage controller 108 may further be configured to store the data on the first storage device 102 upon reception of the data and the indicator by the receiver 106. The storage controller 108 may further be configured to store the data on the first storage device 102 or to store the data on the second storage device 104 based on the determination upon the loading of the at least part of the data.

The first storage device 102 may be provided in a file system of an operating system. The second storage device 104 may also be provided in the file system.

The first storage device 102 and the second storage device 104 may be provided in a Redundant Array of independent Disks (RAID) structure, for example in a RAID-0 structure.

The interface 202 may be an interface to a data source external from the data storage system 200. The receiver 106 may further be configured to receive the data and the indicator via the interface 202.

The indication may be provided by a provider of the data.

The data may include or may be data representing a computer program. The storage controller may further be configured to store the data on the first storage device 102 or on the second storage device 104 based on the determination upon loading of the data for execution of the computer program.

The storage controller 108 may further be configured to store the data on the first storage device 102 upon reception of the data and configured to store the data on the first storage device 102 or on the second storage device 104 based on the determination upon loading of the data for execution of the computer program.

The data may include or may be data representing a computer game. The storage controller 108 may further be configured to store the data on the first storage device 102 or on the second storage device 104 based on the determination upon loading of a level of the computer game.

The storage controller 108 may further be configured to store the data on the first storage device 102 upon reception of the data. The storage controller 108 may further be configured to store the data on the first storage device 102 or on the second storage device 104 based on the determination upon loading of a level of the computer game.

According to various embodiments, the first storage device may be a fast storage device, and the second storage device may be a slow storage device (for example slower than the first storage device).

According to various embodiments, an average access time of the first storage device may be shorter than an average access time of the second storage device.

According to various embodiments, an average data transfer rate of the first storage device may be higher than an average data transfer rate of the second storage device.

According to various embodiments, the second storage device may be a fast storage device, and the first storage device may be a slow storage device (for example slower than the second storage device).

According to various embodiments, an average access time of the first storage device may be longer than an average access time of the second storage device.

According to various embodiments, an average data transfer rate of the first storage device may be lower than an average data transfer rate of the second storage device.

Figure 3:
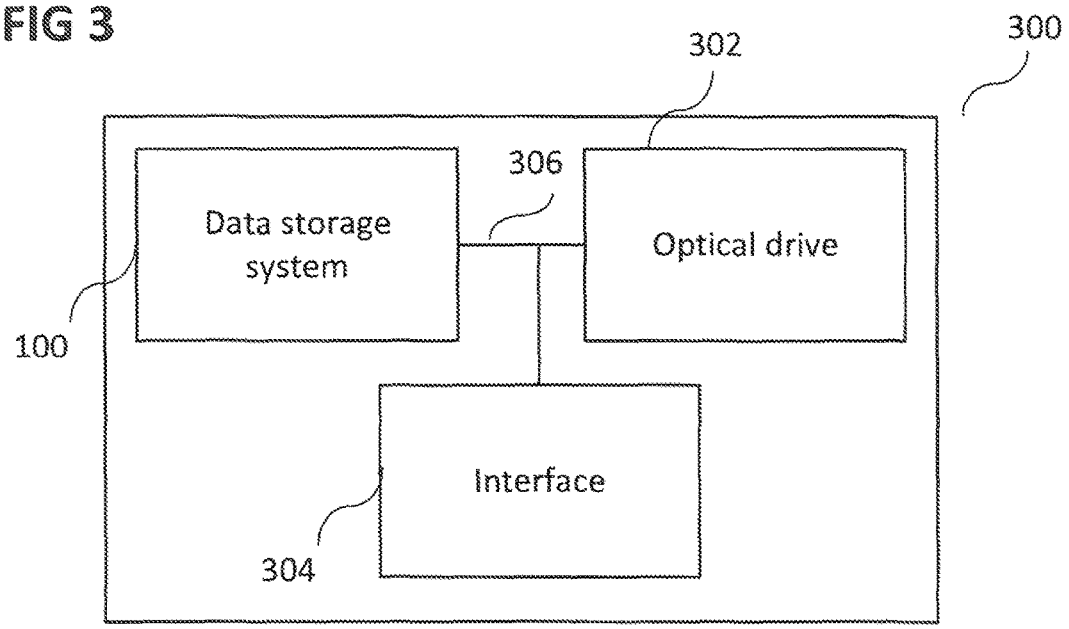
FIG. 3 shows a computing system in accordance with an embodiment.

FIG. 3 shows a computing system 300 in accordance with an embodiment. The computing system 300 may include a data storage system (for example the data storage system 100 of FIG. 1 or the data storage system. 200 of FIG. 2). The computing system 300 may further include an optical drive 302, like will be described below. The computing system 300 may further include an interface 304, like will be described below. The data storage system 100 (or 200), the optical drive 302, and the interface 304 may be connected via a connection 306 (or a plurality of separate connections), for example an electrical or optical connection, for example any kind of cable or bus. The computing system may for example be a computer, for example a workstation, a desktop computer, or a portable computer like a laptop or notebook or netbook.

The data receiver 106 of the data storage system 100 may be configured to receive the data and the indicator from the optical drive 302.

The optical drive 302 may include or may be at least one of a compact disc (CD) drive, a digital versatile disc (DVD) drive, or a Blu-ray disc (BD) drive.

The data receiver 106 of the data storage system 100 may be configured to receive the data and the indicator via the interface 304.

The interface 304 may include or may be at least one of a local area network (LAN) interface, a wireless local area network (WLAN) interface, a mobile radio communication interface, a Bluetooth (BT) interface, a universal serial bus (USB) interface, a firewire interface, or a Thunderbolt interface.

Figure 4:
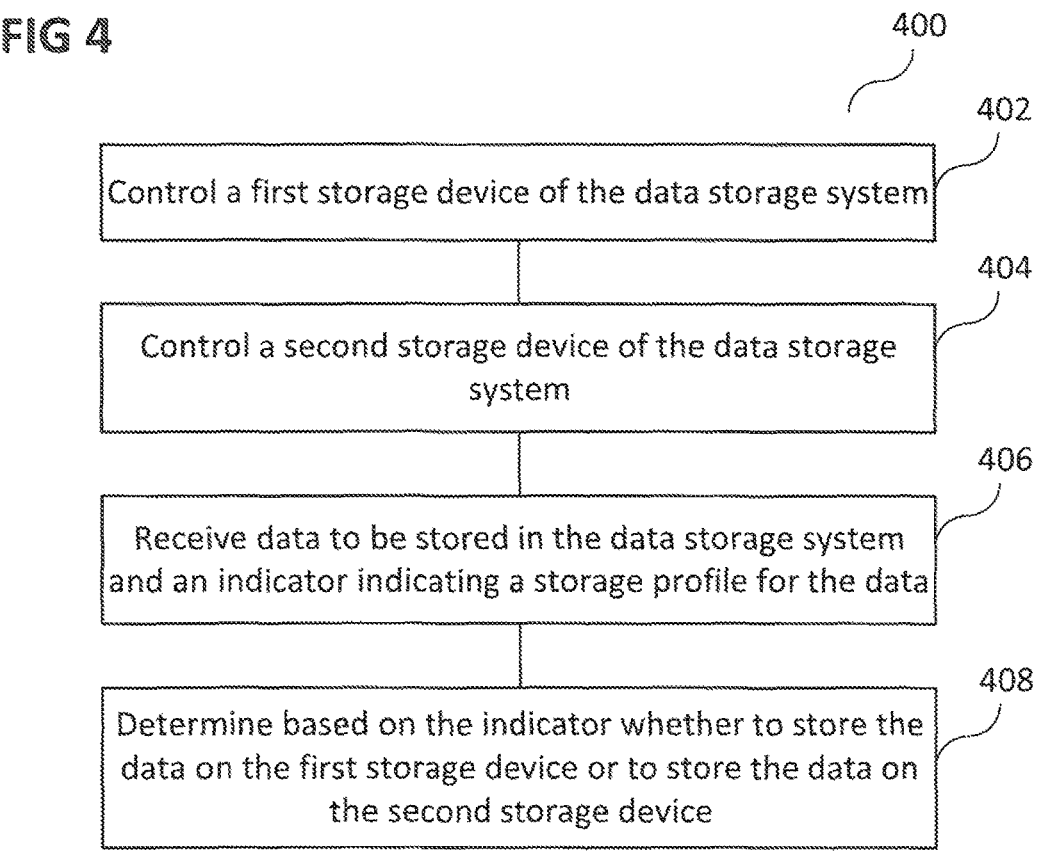
FIG. 4 shows flow diagram illustrating a method for controlling a data storage system in accordance with an embodiment.

FIG. 4 shows flow diagram 400 illustrating a method for controlling a data storage system in accordance with an embodiment. In 402, a first storage device of the data storage system may be controlled. The first storage device may include or may be a hard disk drive and/or a solid state drive. In 404, a second storage device of the data storage system may be controlled. The second storage device may include or may be a hard disk drive and/or a solid state drive. In 406, data to be stored in the data storage system and an indicator indicating a storage profile for the data may be received. In 408, it may be determined based on the indicator whether to store the data on the first storage device or to store the data on the second storage device.

The storage profile may include or may be information indicating which portions of the data are to be stored on the first storage device and Which portions of the data are to be stored on the second storage device.

The method may further include storing the data on the first storage device or on the second storage device based on the determination upon reception of the data and the indicator by the receiver.

The method may further include: loading at least a part of the data to an application processor; and storing the data on the first storage device or on the second storage device based on the determination upon the loading of the at least part of the data.

The method may further include: storing the data on the first storage device upon reception of the data and the indicator by the receiver; and storing the data on the first storage device or on the second storage device based on the determination upon the loading of the at least part of the data.

The first storage device may be provided in a file system of an operating system. The second storage device may be provided in the same file system.

The first storage device and the second storage device may be provided in a Redundant Array of Independent Disks (RAID) structure, for example according to RAID-0.

The method may further include receiving the data and the indicator via an interface to a data source external from the data storage system.

The indication may be provided by a provider of the data.

The data may include or may be data representing a computer program. The method may further include storing the data on the first storage device or on the second storage device based on the determination upon loading of the data for execution of the computer program.

The method may further include: storing the data on the first storage device upon reception of the data; and storing the data on the first storage device or on the second storage device based on the determination upon loading of the data for execution of the computer program.

The data may include or may be data representing a computer game. The method may further include storing the data on the first storage device or on the second storage device based on the determination upon loading of a level of the computer game.

The method may further include: storing the data on the first storage device upon reception of the data; and storing the data on the first storage device or on the second storage device based on the determination upon loading of a level of the computer game.

According to various embodiments, the first storage device may be a fast storage device, and the second storage device may be a slow storage device (for example slower than the first storage device).

According to various embodiments, an average access time of the first storage device may be shorter than an average access time of the second storage device.

According to various embodiments, an average data transfer rate of the first storage device may be higher than an average data transfer rate of the second storage device.

According to various embodiments, the second storage device may be a fast storage device, and the first storage device may be a slow storage device (for example, slower than the second storage device).

According to various embodiments, an average access time of the first storage device may be longer than an average access time of the second storage device.

According to various embodiments, an average data transfer rate of the first storage device may be lower than an average data transfer rate of the second storage device.

A method for controlling a computing system may be provided. The method may include the method for controlling a data storage system like described above.

The method may further include: controlling an optical drive; and receiving the data and the indicator from the optical drive.

The optical drive may include or may be at least one of a compact disc (CD) drive, a digital versatile disc (DVD) drive, or a Blu-ray disc (BD) drive.

The method may further include: controlling an interface; and receiving the data and the indicator via the interface.

The interface may include or may be at least one of a local area network (LAN) interface, a wireless local area network (WLAN) interface, a mobile radio communication interface, a Bluetooth (BT) interface, a universal serial bus (USB) interface, a firewire interface, or a Thunderbolt interface.

Devices and methods may be provided for optimized asset loading mechanism from multiple data storage devices.

Computing systems like for example computers and laptops may use a dual-storage system with "hybrid drives" or similarly, with a separate hard disk drive (HDD) and solid state drive (SSD).

Various algorithms and methods have been implemented for moving specific data to the SSD in order to optimize performance and decrease load-times of large segments of data, while retaining the cost benefit of a smaller capacity SSD.

Taking an example from the gaming industry, recent video games may be relatively large in size (for example in the region of several GB (gigabytes)) and may quickly consume the entire solid state drive unless an intelligent approach is used to reduce the amount of data cached.

Devices and methods exist which use algorithms to determine which data is most often accessed and should therefore be placed on the faster of the two data storage types.

The problem with this approach may be that it is a learned one, requiring time from the user's, perspective for the correct data to be placed on the SSD and the user being unable to control which applications are most important from a performance standpoint. Having certain data load quickly could be very desirable to the user, despite the fact that it is not often accessed—such as loading the next level of a video game.

Whereas the above mentioned commonly used devices and methods may wait for the user to start loading content to determine the best placement of data on the SSD, according to various embodiments, devices and methods may be provided which may improve the user experience without relying on such learned algorithms.

According to various embodiments, devices and methods may be provided which may have a whitelist of known games and their assets to be loaded when launching the game or level. This data may be empirically determined beforehand by examining files accessed during load events or otherwise learned from the ISV (independent software vendor) or software creators.

According to various embodiments, once the dataset has been determined, moving only the relevant data to the SSD may reduce the capacity requirements for a faster loading game experience. This may allow more game titles (or generally more data) to be reliably accelerated on a small capacity SSD and may eliminate the requirement of having this data commonly accessed for acceleration.

In order to avoid a custom version of software or game (in other words: a special version of the software, especially adapted to the devices and methods according to various embodiments), the SSD may be provided to be seen as a cache and may exist within a single file system of the OS. This may mean that despite the data being split up between two drives, the subdirectory structure of the game may not be interrupted or perceived as any different by the Operating System (OS). This may be accomplished for example through the implementation of a Raid 0 file structure.

This may allow for a transparent feature from the user perspective, where the end user does not have or require knowledge of the whitelist data for game installation, removal, modification, or the like.

The following examples pertain to further embodiments.

Example 1 is a data storage system comprising: a first storage device; a second storage device; a data receiver configured to receive data to be stored in the data storage system and an indicator indicating a storage profile for the data; and a storage controller configured to determine based on the indicator whether to store the data on the first storage device or to store the data on the second storage device.

In example 2, the subject-matter of example 1 can optionally include that the first storage device comprises at least one of a hard disk drive or a solid state drive.

In example 3, the subject-matter of any one of examples 1 to 2 can optionally include that the second storage device comprises at least one of a hard disk drive or a solid state drive.

In example 4, the subject-matter of any one of examples 1 to 3 can optionally include that the storage profile comprises information indicating which portions of the data are to be stored on the first storage device and which portions of the data are to be stored on the second storage device.

In example 5, the subject-matter of any one of examples 1 to 4 can optionally include that the storage controller is further configured to store the data on the first storage device or on the second storage device based on the determination upon reception of the data and the indicator by the data receiver.

In example 6, the subject-matter of any one of examples 1 to 5 can optionally include: a data loader configured to load at least a part of the data to an application processor; wherein the storage controller is further configured to store the data on the first storage device or on the second storage device based on the determination upon the loading of the at least part of the data.

In example 7, the subject-matter of example 6 can optionally include that the storage controller is further configured to store the data on the first storage device upon reception of the data and the indicator by the receiver and configured to store the data on the first storage device or on the second storage device based on the determination upon the loading of the at least part of the data.

In example 8, the subject-matter of any one of examples 1 to 7 can optionally include that the first storage device is provided in a file system of an operating system, and that the second storage device is provided in the file system.

In example 9, the subject-matter of any one of examples 1 to 8 can optionally include that the first storage device and the second storage device are provided in a Redundant Array of Independent Disks structure.

In example 10, the subject-matter of any one of examples 1 to 9 can optionally include: an interface to a data source external from the data storage system; wherein the receiver is further configured to receive the data and the indicator via the interface.

In example 11, the subject-matter of any one of examples 1 to 10 can optionally Include that the indication is provided by a provider of the data.

In example 12, the subject-matter of any one of examples 1 to 11 can optionally include that the data comprises data representing a computer program, and that the storage controller is further configured to store the data on the first storage device or on the second storage device based on the determination upon loading of the data for execution of the computer program.

In example 13, the subject-matter of any one of examples 1 to 12 can optionally include that the data comprises data representing a computer game, and that the storage controller is further configured to store the data on the first storage device or on the second storage device based on the determination upon loading of a level of the computer game.

In example 14, the subject-matter of any one of examples 1 to 13 can optionally include that the first storage device is a fast storage device, and that the second storage device is a slow storage device.

In example 15, the subject-matter of any one of examples 1 to 14 can optionally include that an average access time of the first storage device is shorter than an average access time of the second storage device.

In example 16, the subject-matter of any one of examples 1 to 15 can optionally include that an average data transfer rate of the first storage device is higher than an average data transfer rate of the second storage device.

In example 17, the subject-matter of any one of examples 1 to 13 can optionally include that the second storage device is a fast storage device, and that the first storage device is a slow storage device.

In example 18, the subject-matter of any one of examples 1 to 13 or 17 can optionally include that an average access time of the first storage device is longer than an average access time of the second storage device.

In example 19, the subject-matter of any one of examples 1 to 13, 17, or 18 can optionally include that an average data transfer rate of the first storage device is lower than an average data transfer rate of the second storage device.

Example 20 is a computing system, comprising: the data storage system of any one of examples 1 to 19.

In example 21, the subject-matter of example 20 can optionally include: an optical drive; wherein the data receiver is configured to receive the data and the indicator from the optical drive.

In example 22, the subject-matter of any one of examples 20 to 21 can optionally include: an interface; wherein the data receiver is configured to receive the data and the indicator via the interface.

In example 23, the subject-matter of any one of examples 20 to 22 can optionally include that the interface comprises at least one of a local area network interface, a wireless local area network interface, a mobile radio communication interface, a universal serial bus interface, and a Thunderbolt interface.

Example 24 is a method for controlling a data storage system, the method comprising: controlling a first storage device of the data storage system; controlling a second storage device of the data storage system; receiving data to be stored in the data storage system and an indicator indicating a storage profile for the data and determining based on the indicator whether to store the data on the first storage device or to store the data on the second storage device.

In example 25, the subject-matter of example 24 can optionally include that the first storage device comprises at least one of a hard disk drive or a solid state drive.

In example 26, the subject-matter of any one of examples 24 to 25 can optionally include that the second storage device comprises at least one of a hard disk drive or a solid state drive.

In example 27, the subject-matter of any one of examples 24 to 26 can optionally include that the storage profile comprises information indicating which portions of the data are to be stored on the first storage device and which portions of the data are to be stored on the second storage device.

In example 28, the subject-matter of any one of examples 24 to 27 can optionally include: storing the data on the first storage device or on the second storage device based on the determination upon reception of the data and the indicator by the receiver.

In example 29, the subject-matter of any one of examples 24 to 28 can optionally include: loading at least a part of the data to an application processor; storing the data on the first storage device or on the second storage device based on the determination upon the loading of the at least part of the data.

In example 30, the subject-matter of example 29 can optionally include: storing the data on the first storage device upon reception of the data and the indicator by the receiver; and storing the data on the first storage device or on the second storage device based on the determination upon the loading of the at least part of the data.

In example 31, the subject-matter of any one of examples 24 to 30 can optionally include that the first storage device is provided in a file system of an operating system; and that the second storage device is provided in the file system.

In example 32, the subject-matter of any one of examples 24 to 31 can optionally include that the first storage device and the second storage device are provided in a Redundant Array of Independent Disks structure.

In example 33, the subject-matter of any one, of examples 24 to 32 can optionally include: receiving the data and the indicator via an interface to a data source external from the data storage system.

In example 34, the subject-matter of any one of examples 24 to 33 can optionally include that the indication is provided by a provider of the data.

In example 35, the subject-matter of any one of examples 24 to 34 can optionally include that the data comprises data representing a computer program, and that the method further comprises storing the data on the first storage device or on the second storage device based on the determination upon loading of the data for execution of the computer program.

In example 36, the subject-matter of any one of examples 24 to 35 can optionally include that the data comprises data representing a computer game, and that the method further comprises storing the data on the first storage device or on the second storage device based on the determination upon loading of a level of the computer game.

In example 37, the subject-matter of any one of examples 24 to 36 can optionally include that the first storage device is a fast storage device, and that the second storage device is a slow storage device.

In example 38, the subject-matter of any one of examples 24 to 37 can optionally include that an average access time of the first storage device is shorter than an average access time of the second storage device.

In example 39, the subject-matter of any one of examples 24 to 38 can optionally include that an average data transfer rate of the first storage device is higher than an average data transfer rate of the second storage device.

In example 40, the subject-matter of any one of examples 24 to 36 can optionally include that the second storage device is a fast storage device, and that the first storage device is a slow storage device.

In example 41, the subject-matter of any one of examples 24 to 36 or 40 can optionally include that an average access time of the first storage device is longer than an average access time of the second storage device.

In example 42, the subject-matter of any one of examples 24 to 36, 40, or 41 can optionally include that an average data transfer rate of the first storage device is lower than an average data transfer rate of the second storage device.

Example 43 is a method for controlling a computing system, the method comprising: the method of any one of examples 24 to 42.

In example 44, the subject-matter of example 43 can optionally include: controlling an optical drive; and receiving the data and the indicator from the optical drive.

In example 45, the subject-matter of any one of examples 43 to 44 can optionally include: controlling an interface; and receiving the data and the indicator via the interface.

In example 46, the subject-matter of any one of examples 43 to 45 can optionally include that the interface comprises at least one of a local area network interface, a wireless local area network interface, a mobile radio communication interface, a universal serial bus interface, and a Thunderbolt interface.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A data storage system comprising:
   a first storage device;
   a second storage device;
   a data receiver configured to receive data to be stored in the data storage system and an indicator indicating a storage profile for the data, wherein the data comprises a computer program;
   a data loader configured to load at least a part of the data to an application processor for execution of the computer program; and
   a storage controller configured to:
      store the data on the first storage device upon reception of the data and the indicator by the data receiver; and
      determine, upon loading of the at least part of the data for the execution of the computer program, based on the indicator whether to store a portion of the data on the first storage device or to store the portion of the data on the second storage device.

2. The data storage system of claim 1,
   wherein the first storage device comprises at least one of a hard disk drive or a solid state drive.

3. The data storage system of claim 1,
   wherein the second storage device comprises at least one of a hard disk drive or a solid state drive.

4. The data storage system of claim 1,
   wherein the storage profile comprises information indicating which portions of the data are to be stored on the first storage device and which portions of the data are to be stored on the second storage device.

5. The data storage system of claim 1,
   wherein the first storage device is provided in a file system of an operating system;
   wherein the second storage device is provided in the file system.

6. The data storage system of claim 1,
   wherein the first storage device and the second storage device are provided in a Redundant Array of Independent Disks structure.

7. The data storage system of claim 1, further comprising:
   an interface to a data source external from the data storage system;
   wherein the data receiver is further configured to receive the data and the indicator via the interface.

8. The data storage system of claim 1,
   wherein the indication is provided by a provider of the data.

9. The data storage system of claim 1,
   wherein the computer program is a computer game;
   wherein the storage controller is further configured to store the data on the first storage device or on the second storage device based on the determination upon loading of a level of the computer game.

10. The data storage system of claim 1,
    wherein an average access time of the first storage device is shorter than an average access time of the second storage device.

11. The data storage system of claim 1,
    wherein an average data transfer rate of the first storage device is higher than an average data transfer rate of the second storage device.

12. The data storage system of claim 1,
    wherein an average access time of the first storage device is longer than an average access time of the second storage device.

13. The data storage system of claim 1,
    wherein an average data transfer rate of the first storage device is lower than an average data transfer rate of the second storage device.

14. A method for controlling a data storage system, the method comprising:
    controlling a first storage device of the data storage system;
    controlling a second storage device of the data storage system;
    receiving data to be stored in the data storage system and an indicator indicating a storage profile for the data, wherein the data comprises a computer program;
    storing the data on the first storage device upon reception of the data and the indicator;
    loading at least a part of the data to an application processor for execution of the computer program; and
    determining, upon loading of the at least part of the data for the execution of the computer program, based on the indicator whether to store a portion of the data on the first storage device or to store the portion of the data on the second storage device.

15. The method of claim 14, further comprising:
    receiving the data and the indicator via an interface to a data source external from the data storage system.

* * * * *